United States Patent
Miossec et al.

(10) Patent No.: US 12,065,988 B2
(45) Date of Patent: Aug. 20, 2024

(54) STRUCTURAL AND/OR ACOUSTIC PANEL COMPRISING A U-SHAPED SEALING FLANGE DIRECTED TOWARD THE INSIDE OF THE PANEL, AND METHOD FOR MANUFACTURING SUCH A PANEL

(71) Applicant: SAFRAN NACELLES, Gonfreville-l'Orcher (FR)

(72) Inventors: Tony Miossec, Moissy-Cramayel (FR); Philippe Bienvenu, Moissy-Cramayel (FR); Emilie Bemont, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 22 days.

(21) Appl. No.: 17/641,383

(22) PCT Filed: Sep. 7, 2020

(86) PCT No.: PCT/FR2020/051538
§ 371 (c)(1),
(2) Date: Mar. 8, 2022

(87) PCT Pub. No.: WO2021/048489
PCT Pub. Date: Mar. 18, 2021

(65) Prior Publication Data
US 2022/0325681 A1    Oct. 13, 2022

(30) Foreign Application Priority Data
Sep. 9, 2019  (FR) ..................... 19 09906

(51) Int. Cl.
*F02K 1/82*    (2006.01)

(52) U.S. Cl.
CPC ........ *F02K 1/827* (2013.01); *F05D 2230/237* (2013.01); *F05D 2260/96* (2013.01)

(58) Field of Classification Search
CPC .... F02C 7/045; F02K 1/827; F05D 2230/237; F05D 2250/283; F05D 2250/75;
(Continued)

(56) References Cited

U.S. PATENT DOCUMENTS 6,857,669 B2 *   2/2005  Porte ............... F01D 25/243
                                              285/368
7,926,285 B2 *   4/2011  Tisdale ............... F02K 1/48
                                               60/770
(Continued)

FOREIGN PATENT DOCUMENTS

EP    2 781 728 A2    9/2014
FR    3 014 011 A1    6/2015
(Continued)

OTHER PUBLICATIONS

International Search Report issued Nov. 6, 2020 in PCT/FR2020/051538, filed on Sep. 7, 2020, 2 pages.
(Continued)

*Primary Examiner* — Jesse S Bogue
(74) *Attorney, Agent, or Firm* — Oblon, McClelland, Maier & Neustadt, L.L.P.

(57) ABSTRACT

A structural and/or acoustic panel including an inner skin, an outer skin, a honeycomb structure and at least one sealing flange. The sealing flange has a U-shaped section directed toward the honeycomb structure and is clamped with the honeycomb structure between the inner and the outer skins. A method for manufacturing such a panel by soldering the component elements thereof is also disclosed.

10 Claims, 12 Drawing Sheets

(58) Field of Classification Search
CPC .......... F05D 2260/96; F05D 2260/963; G10K 11/172; Y02T 50/60
See application file for complete search history.

(56) References Cited

U.S. PATENT DOCUMENTS

| | | | | |
|---|---|---|---|---|
| 8,544,598 | B2 * | 10/2013 | Gaudry | .................. F02C 7/045 |
| | | | | 415/119 |
| 8,650,853 | B2 * | 2/2014 | Porte | ....................... F02C 7/045 |
| | | | | 415/119 |
| 10,337,453 | B2 * | 7/2019 | Brice | ........................ F02K 1/04 |
| 11,680,524 | B1 * | 6/2023 | Heeter | ...................... F02C 7/00 |
| | | | | 181/214 |
| 2011/0133025 | A1 | 6/2011 | Vauchel et al. | |
| 2015/0041059 | A1 * | 2/2015 | Olson | .................... B32B 37/12 |
| | | | | 156/60 |

FOREIGN PATENT DOCUMENTS

| | | |
|---|---|---|
| WO | WO 2010/012900 A2 | 2/2010 |
| WO | WO 2014/020286 A1 | 2/2014 |
| WO | WO 2018/087502 A1 | 5/2018 |

OTHER PUBLICATIONS

French Preliminary Search Report issued Apr. 29, 2020 in French Application 19 09906, filed on Sep. 9, 2019, 2 pages (with English Translation of Categories).

\* cited by examiner

STRUCTURAL AND/OR ACOUSTIC PANEL COMPRISING A U-SHAPED SEALING FLANGE DIRECTED TOWARD THE INSIDE OF THE PANEL, AND METHOD FOR MANUFACTURING SUCH A PANEL

TECHNICAL FIELD

The invention relates to the field of the manufacture of a structural and/or acoustic panel of the type comprising two skins and an alveolar structure enclosed between these skins.

In particular, the invention relates to the aeronautical field, and relates more specifically to aircraft propulsion assembly components comprising at least one such panel.

PRIOR ART

An aircraft propulsion assembly comprises several structural panels commonly referred to as "sandwich panels", essentially formed by two skins and an alveolar structure enclosed between these skins. Such panels are for example used to form all or part of an ejection jet nozzle or of an inner fixed structure of the nacelle of the propulsion assembly.

The alveolar structure of the panel generally consists of transverse partitions connecting the skins and thus contributing to the structural strength of the panel. The transverse partitions delimit cells, i.e. spaces devoid of material, which makes it possible in particular to reduce the mass of the panel.

Such a panel can furthermore have an acoustic function in order to attenuate the noise generated by the propulsion assembly. The skin intended to be oriented towards the noise source is for this purpose rendered permeable to air, typically using ports passing through this skin to guide the air inside the cells and thus absorb acoustic energy.

Brazing is a conventional technique for fastening the constituent elements of such a structural and/or acoustic panel to one another during the manufacture thereof. This technique consists of heating a filling metal inserted between the elements to be assembled to the melting point thereof. The filling metal can take the form of a strip, a powder or a paste and is chosen such that the melting point thereof is less than the melting point of the elements to be assembled.

To enhance the structural strength of the panel, it generally comprises sealing flanges having a U-shaped cross-section. The sealing flanges are typically arranged on the lateral boundary of the alveolar structure, according to the principle illustrated in FIG. 2 of the document WO 2018/087502 A1. Compared to a sealing flange in solid bar form, the U-shaped cross-section makes it possible to reduce the mass of the panel.

Given the geometry of such a sealing flange, the lateral boundary of the panel comprises a hollow, which can complicate the assembly thereof with another structure.

DESCRIPTION OF THE INVENTION

The aim of the invention is that of providing a structural and/or acoustic panel making it possible to simply the assembly of this panel with another structure.

To this end, the invention relates to a structural and/or acoustic panel for an aircraft propulsion assembly, this panel comprising an inner skin, an outer skin, an alveolar structure and at least one sealing flange, this sealing flange comprising a base and two lateral arms connected to the base, each lateral arm comprising a free end, the lateral arms and the base delimiting a cavity which opens at the free end of the lateral arms, the alveolar structure and the sealing flange being enclosed between the inner skin and the outer skin, one of the lateral arms of the sealing flange being fastened to the inner skin, the other lateral arm of the sealing flange being fastened to the outer skin. According to the invention, the free end of each of the lateral arms is facing the alveolar structure.

Hereinafter, reference is generally made to a single sealing flange. The features described for one sealing flange can obviously be applied to each of the sealing flanges of the panel when the latter comprises several.

The sealing flange of the panel according to the invention can have a conventional geometry, for example a cross-section having substantially a U shape. Thus, in an embodiment, the base can be substantially perpendicular to each of the lateral arms. In another embodiment, the base can have a non-planar geometry, for example a V-shaped cross-section pointing towards the outside of the panel.

The invention is characterised more specifically by the arrangement of the sealing flange in relation to the other elements of the panel since, unlike conventional panels, the free ends of the lateral arms are not oriented towards the outside of the panel but towards the inside thereof, i.e. towards the alveolar structure.

In this way, the lateral boundary of the panel is formed by the base of the sealing flange.

This makes it possible to facilitate the assembly of the panel with other structures.

For example, when the sealing flange has a planar base, the panel can be assembled with another similar panel by welding together the base of a respective sealing flange of each of these panels.

In an embodiment, the panel can comprise one or more reinforcements extending into said cavity so as to keep the lateral arms of the sealing flange separated from one another.

Such reinforcements help improve the manufacture of the panel, in particular the fastening of the constituent elements thereof to one another, particularly in the case where this fastening is performed by brazing.

Indeed, the brazing of the panel can typically be carried out by gas pressurisation of the elements to be assembled in a vacuum furnace. This conventional technique makes it possible to press one of the skins against the other elements, under the effect of a gas which expands when the temperature rises in the furnace.

One of the skins is thus pressed against the alveolar structure and against one of the lateral arms of the sealing flange, which causes pressing of the alveolar structure and this sealing flange, via the base thereof, against the other skin which in turn bears against a counter-form.

The lateral arm located on the side of the skin bearing against the counter-form is not pressed per se on this skin under the effect of this gaseous pressure. In view of the thermal expansion of the sealing flange during brazing, this lateral arm is consequently liable to collapse and not be correctly fastened to this skin, which can weaken the panel.

The cavity being oriented towards the inside of the panel, it is not possible to insert a conventional tool therein to keep the lateral arms of the sealing flange separated from one another in order to prevent such a collapse.

The reinforcement(s) of the panel according to the invention make it possible to perform this holding function.

The description above also applies when the pressing of the elements to be assembled is obtained by applying a mechanical pressure resulting for example from a differential thermal expansion of tool elements. In other words, the invention is compatible with different techniques for fastening the constituent elements of the panel to one another.

To a certain extent, the reinforcements can also enhance the structural strength of the panel during the use thereof.

Non-limiting examples of reinforcements are described hereinafter.

In an embodiment, the reinforcements can comprise transverse walls fastened to the lateral arms of the sealing flange and spaced apart along a principal direction along which the sealing flange extends.

According to a first alternative embodiment, the transverse walls can extend between the free end of the lateral arms of the sealing flange and the base of this sealing flange, perpendicularly to said principal direction.

According to a second alternative embodiment, the transverse walls can extend parallel with said principal direction such that the transverse walls are fastened to the free ends of the lateral arms of the sealing flange.

These alternative embodiments can be combined with one another such that the panel comprises both transverse walls perpendicular to the principal direction and transverse walls parallel with the principal direction.

The distance between two transverse walls can be between 10 mm and 30 mm, and preferably be approximately equal to 20 mm.

These spacing values are given by way of non-limiting example and can in this instance be suitable for a standard-sized ejection jet nozzle panel.

In an embodiment, the reinforcements can comprise foils each comprising a base and two lateral arms connected to the base, each lateral arm of each foil comprising a free end facing the base of the sealing flange, the base of each foil extending between the free ends of the sealing flange.

Such foils can thus have a U-shaped cross-section and be imbricated in the cavity such that the U of these foils is oriented in an opposite direction in relation to the direction wherein the U of the sealing flange is oriented.

In another embodiment, the reinforcement(s) can comprise one or more portions of said alveolar structure.

For this purpose, the alveolar structure can be machined in stages.

In another embodiment, the reinforcement(s) can comprise one or more other alveolar structures, i.e. one or more different alveolar structures from the alveolar structure fastened to the two skins.

Obviously, these different embodiments can be combined with one another such that one or more reinforcements are formed by one or more of said lateral walls and/or one or more other reinforcements are formed by one or more of said foils and/or one or more other reinforcements are formed by one or more parts of the alveolar structure and/or one or more other reinforcements are formed by one or more of said other alveolar structures.

Furthermore, such reinforcements can be fastened to the sealing flange, for example by welding or brazing, before fastening this flange to the other elements of the panel.

Preferably, the inner and outer skins, the alveolar structure and the sealing flanges can comprise metal.

The panel can have an overall planar or curved shape, or have a relatively complex geometry according to the purpose thereof.

In an embodiment, the panel can have an axis of symmetry about which the inner and outer skins, the alveolar structure and the sealing flange extend.

In other words, the panel can have a substantially annular shape.

In a non-limiting manner, the invention also relates to an aircraft propulsion assembly component, this component being capable of being selected from a list including an ejection plug, an ejection nozzle, an inner fixed structure and an air inlet lip, this component comprising one or more panels as described above.

The invention also relates to an aircraft comprising at least one such component.

More generally, the invention also relates to an aircraft propulsion assembly nacelle and/or an aircraft propulsion assembly and/or an aircraft comprising one or more panels as described above.

The invention also relates to a method for manufacturing a panel as described above, this method comprising a step of disposing the alveolar structure and the at least one sealing flange between the inner skin and the outer skin, and a step of brazing the alveolar structure and the at least one sealing flange with the inner skin and the outer skin.

In an embodiment, this method can comprise a step of disposing one or more of the reinforcements described above in the cavity of the at least one sealing flange before implementing said brazing step.

Obviously, the reinforcement(s) can be disposed in the cavity of a sealing flange before positioning this sealing flange between the inner and outer skins of the panel.

Further advantages and features of the invention will emerge on reading the following non-limiting detailed description.

BRIEF DESCRIPTION OF THE DRAWINGS

The following detailed description refers to the appended drawings wherein.

DETAILED DESCRIPTION OF EMBODIMENTS

Figure 1:
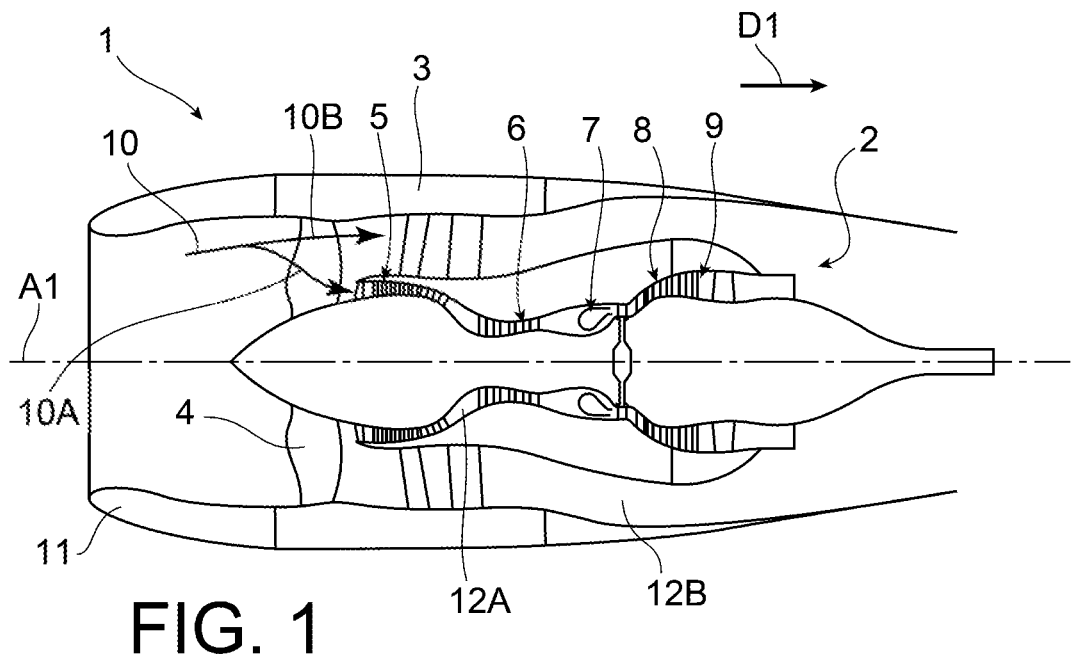
FIG. 1 is a schematic axial sectional view of an aircraft propulsion assembly.

In FIG. 1, an aircraft propulsion assembly 1 comprising a turbine engine 2 faired by a nacelle 3 is represented. In this example, the turbine engine 2 is a dual-body and dual-flow jet engine.

Hereinafter, the terms "upstream", "downstream", "front" and "rear" are defined with respect to a direction D1 of gas flow through the propulsion assembly 1 when the latter is propelled.

The jet engine 2 has a longitudinal central axis A1 about which extend the various components thereof, in this instance, from upstream to downstream of the jet engine 2, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

Conventionally, during the operation of such a jet engine 2, an air flow 10 enters the propulsion assembly 1 through an air inlet 11 upstream from the nacelle 3, traverses the fan 4 and then is split into a central primary flow 10A and a secondary flow 10B. The primary flow 10A flows in a primary gas circulation jet 12A traversing the gas generator.

The secondary flow 10B flows for its part in a secondary jet 11B surrounding the gas generator and delimited radially outwards by the nacelle 3.

Figure 2:
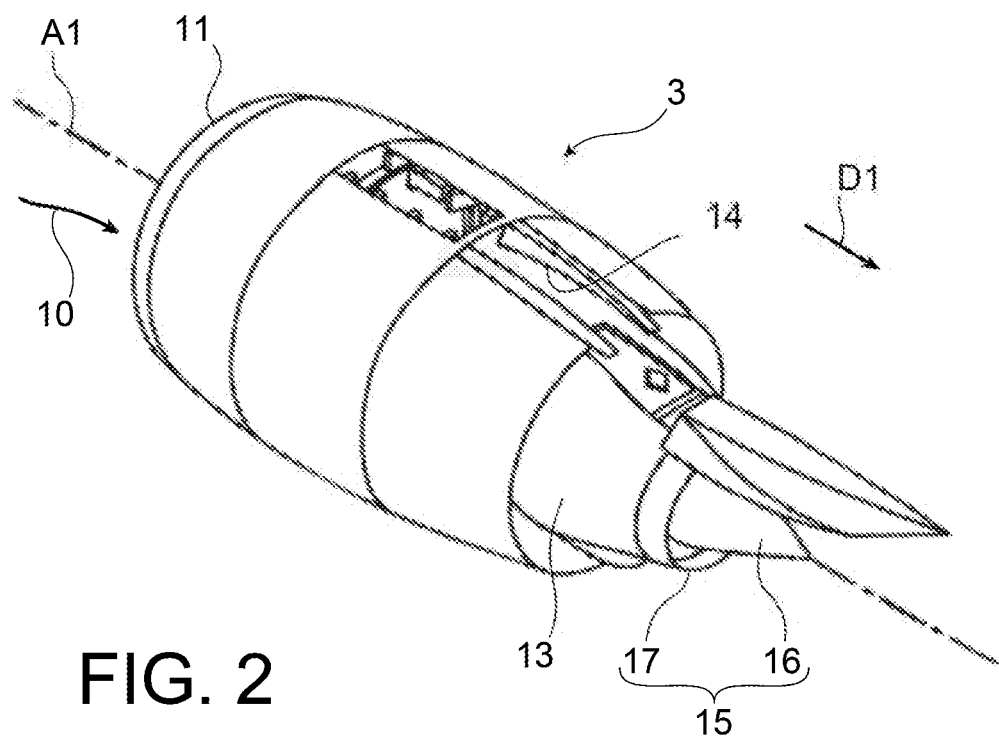
FIG. 2 is a schematic perspective view of an aircraft propulsion assembly nacelle.

FIG. 2 shows separately and in more detail the nacelle 3 of such a propulsion assembly 1.

This figure particularly represents an inner fixed structure 13 surrounding the jet engine 2 and delimiting radially inwards a downstream portion of the secondary jet 11B, as well as an outer fixed structure 14 delimiting this downstream portion of the secondary jet 11B radially outwards.

FIG. 2 also shows an ejection jet nozzle 15 comprising an ejection plug 16 and an ejection nozzle 17. The ejection jet nozzle 15 is configured to discharge downstream of the propulsion assembly 1 the primary flow 10A from the primary jet 12A of the jet engine 2 so as to generate a thrust.

Figure 3:
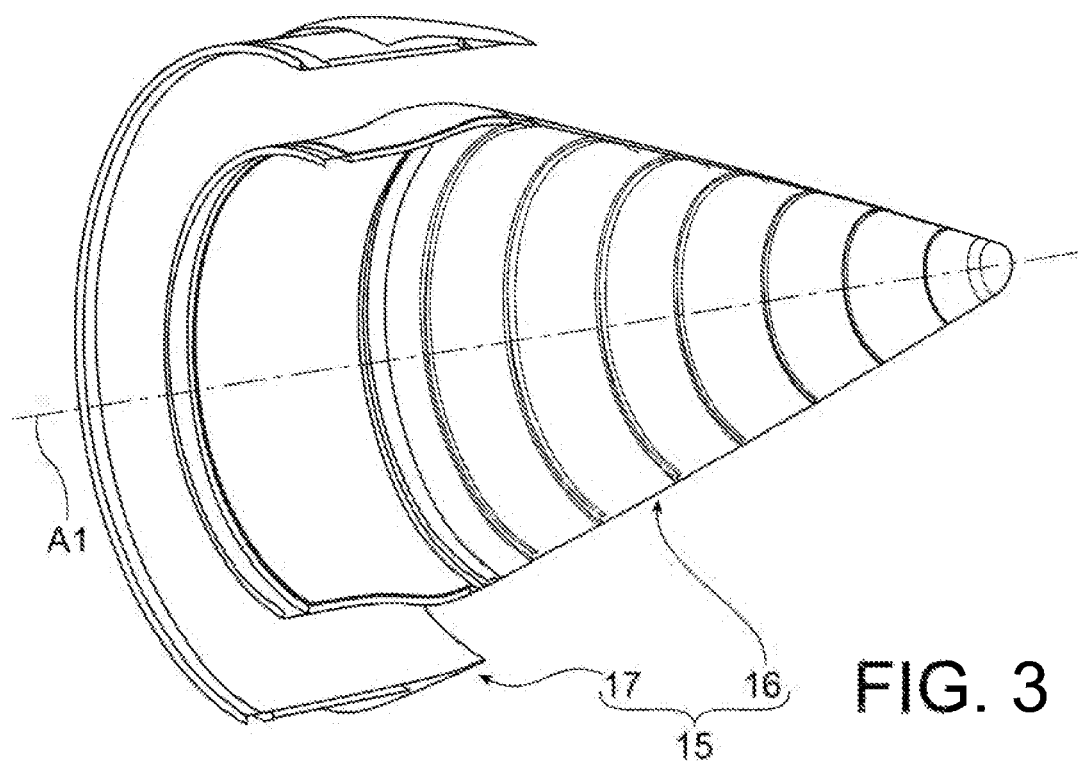
FIG. 3 is a schematic perspective and axial sectional view of an aircraft propulsion assembly ejection jet nozzle.
Figure 4:
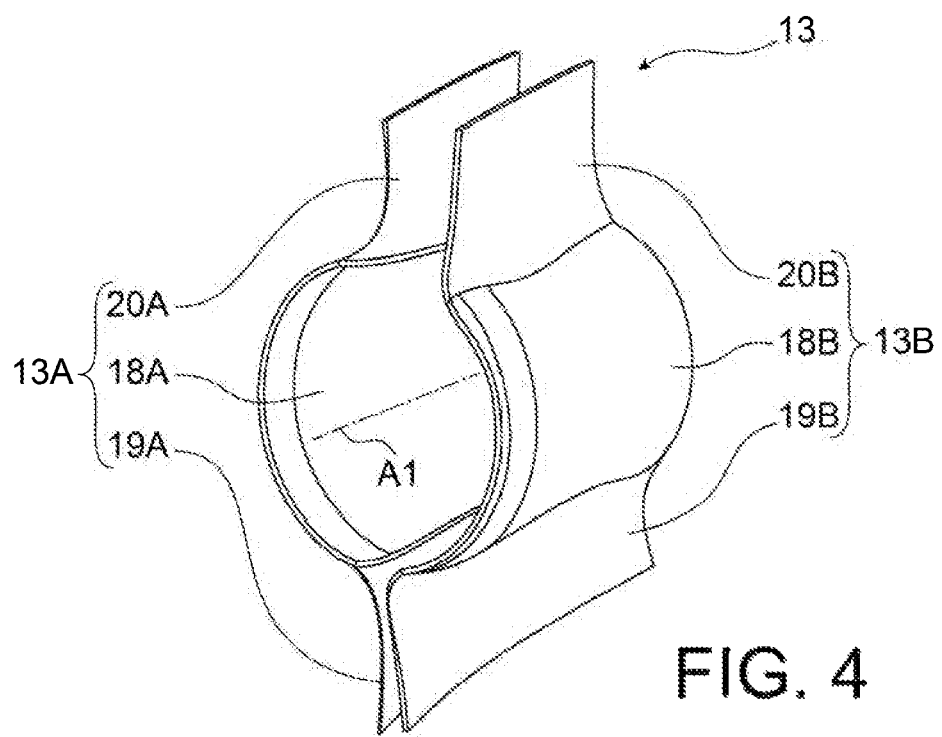
FIG. 4 is a schematic perspective view of an aircraft propulsion assembly inner fixed structure.

FIGS. 3 and 4 respectively show the ejection jet nozzle 15 and the inner fixed structure 13 of this nacelle 3.

With reference to FIG. 3, the ejection plug 16 and the ejection nozzle 17 are both parts of revolution of axis A1, the ejection plug 16 being substantially conical, the ejection nozzle 17 being substantially annular.

With reference to FIG. 4, the inner fixed structure 13 is made of two symmetrical portions 13A and 13B in relation to one another with respect to a vertical median longitudinal plane passing through the longitudinal central axis A1. The portion 13A comprises a semi-annular central part 18A forming a half-barrel as well as two end portions 19A and 20A forming blocks respectively positioned vertically below and above the central part 18A and used to connect the portion 13A of the inner structure 13 to the outer fixed structure 14. The part 13B comprises a central part 18B and blocks 19B and 20B similar to those of the part 13A.

The inner fixed structure 13 and the ejection jet nozzle 15, as well as the other components of the nacelle 3 generally comprise structural and/or acoustic panels which can form all or part of such components.

The invention relates more specifically to the structure and manufacture of such a panel.

Figure 5:
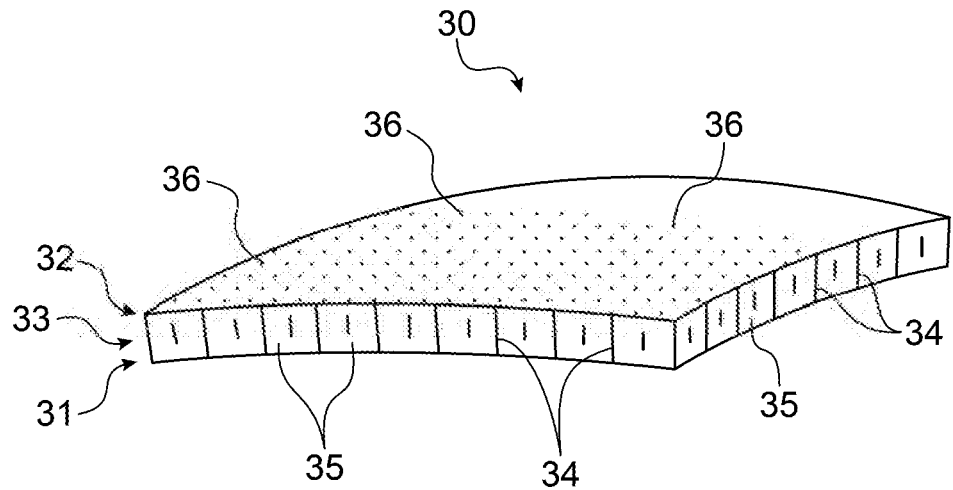
FIG. 5 is a schematic perspective view of a central portion of a panel according to the invention.

FIG. 5 shows a central portion of a panel 30 according to the invention. This panel 30 comprises an inner skin 31, an outer skin 32 and an alveolar structure 33 enclosed between the inner 31 and outer 32 skins.

By way of non-limiting example, the inner 31 and outer 32 skins each have a thickness between 0.2 mm and 2 mm, for example 0.6 mm, and the alveolar structure 33 has a thickness of around ten mm.

The inner skin 31, the outer skin 32 and the alveolar structure 33 comprise in this example metal such as titanium.

In this example, the alveolar structure 33 comprises transverse partitions 34 delimiting therebetween hexagonal cells 35 forming a honeycomb structure. The cells 35 can have any other shape making it possible to prevent telegraphing.

In this example, the inner skin 31 is a solid structuring skin, whereas the outer skin 32 comprises ports 36 intended to guide air in the cells 35 in order to absorb acoustic energy.

The panel 30 in FIG. 5 is therefore an acoustic panel.

Figure 6:
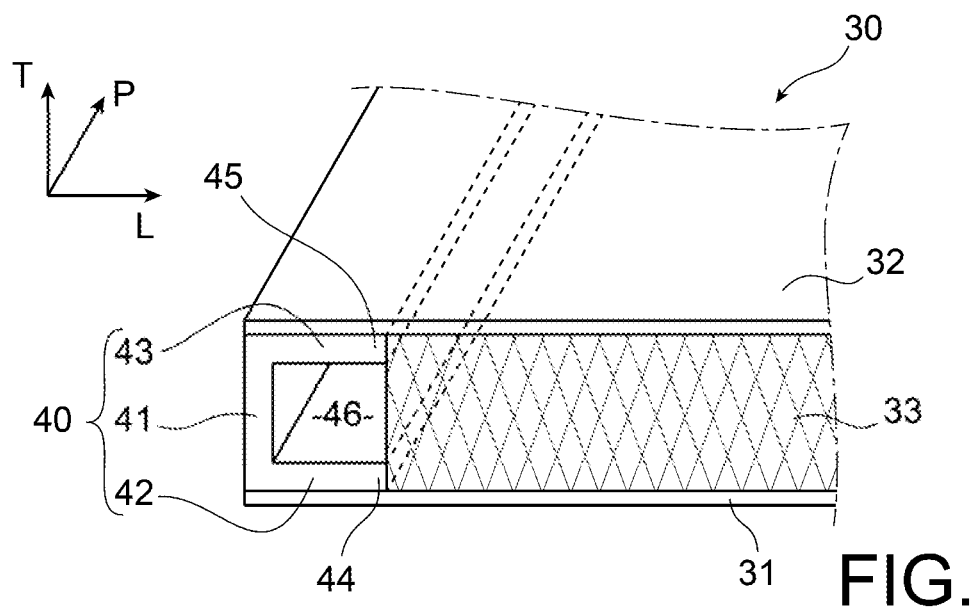
FIG. 6 is a schematic perspective and axial sectional view of an end portion of a panel according to the invention.

FIG. 6 shows a peripheral portion of a panel 30 according to the invention wherein the central portion can correspond to that described above with reference to FIG. 5. In this FIG. 6, transverse partitions 34 of the alveolar structure 33 are not shown but the latter can obviously be of the same type as the alveolar structure 33 in FIG. 5.

FIG. 6 more specifically represents a portion of a sealing (or "close-out") flange 40 arranged according to the invention.

This sealing flange 40 comprises a base 41 and two lateral arms 42 and 43 giving the flange 40 a U-shaped cross-section.

More specifically, the base 41 extends, on one hand, in the direction of the thickness of the panel 30, along a transverse direction T, and along a so-called principal direction P which can be a circumferential direction of the panel 30 when the latter is of annular type.

The lateral arms 42 and 43 each extend along a so-called longitudinal direction L which can be parallel with the central longitudinal axis A1 when the panel 30 is mounted in the propulsion assembly 1. The lateral arms 42 and 43 are each connected to the base 41 so as to form a substantially right angle with the base 41.

The base 41, the lateral arm 42 and the lateral arm 43 have in this example a thickness of approximately 1.5 mm.

The lateral arms 42 and 43 each comprise a free end 44 and 45, respectively.

The lateral arms 42 and 43 and the base 41 delimit a cavity 46 which extends along the principal direction P and which, in the longitudinal direction L, opens at the free ends 44 and 45. The opening of this cavity 46 is considered relative to the sealing flange 40 independently of the other elements of the panel 30.

The sealing flange 40 has a total thickness which corresponds to the thickness of the alveolar structure 33 and is positioned against the latter such that the free end 44/45 of each of the lateral arms 42/43 is facing the alveolar structure 33.

Thus, the cavity 46 is in this example delimited transversally by the lateral arms 42 and 43, and longitudinally, on one hand, by the base 41 and, on the other, by the alveolar structure 33.

The sealing flange 40 is furthermore enclosed between the skins 31 and 32 fastened thereto in the same way as the alveolar structure 33 (see further below). The lateral arm 42 is fastened to the inner skin 31 and the lateral arm 43 is fastened to the outer skin 32.

In this way, the sealing flange 40 is arranged at one end of the panel 30 such that the base 41 of this flange 40 defines a solid lateral boundary of the panel 30, which facilitates the assembly of the panel 30 with another structure (not shown), for example by welding the base 41 to a portion of this other structure.

Obviously, a gap can be left between the free ends 44 and 45 of the sealing flange 40 and the alveolar structure 33, along the longitudinal direction L. Furthermore, a portion of the alveolar structure 33 can enter the cavity 46 so as to occlude all or part of this cavity 46 (see further below).

The panel 30 can have any shape, for example a substantially conical or annular shape, or a sector of substantially conical or annular shape, to respectively form all of part of the ejection plug 16 or the ejection nozzle 17 in FIG. 3, or a half-barrel shape to form all or part of the central part 18A or 18B of the portion 13A or 13B respectively of the inner fixed structure 13 in FIG. 4, or a substantially planar shape or having any other geometry making it possible to form a portion of the propulsion assembly 1.

Furthermore, the panel 30 can comprise several sealing flanges 40. For example, when the panel 30 is annular, two annular sealing flanges 40 can be used to seal the two annular ends of the panel 30. When the panel 30 is not a revolving part, four sealing flanges 40 can be used to seal the four lateral ends of the panel 30.

According to the invention, the manufacture of the panel 30 comprises a brazing of the constituent elements thereof, preferably by inserting brazing foils between the respective elements to be assembled.

Figure 7:
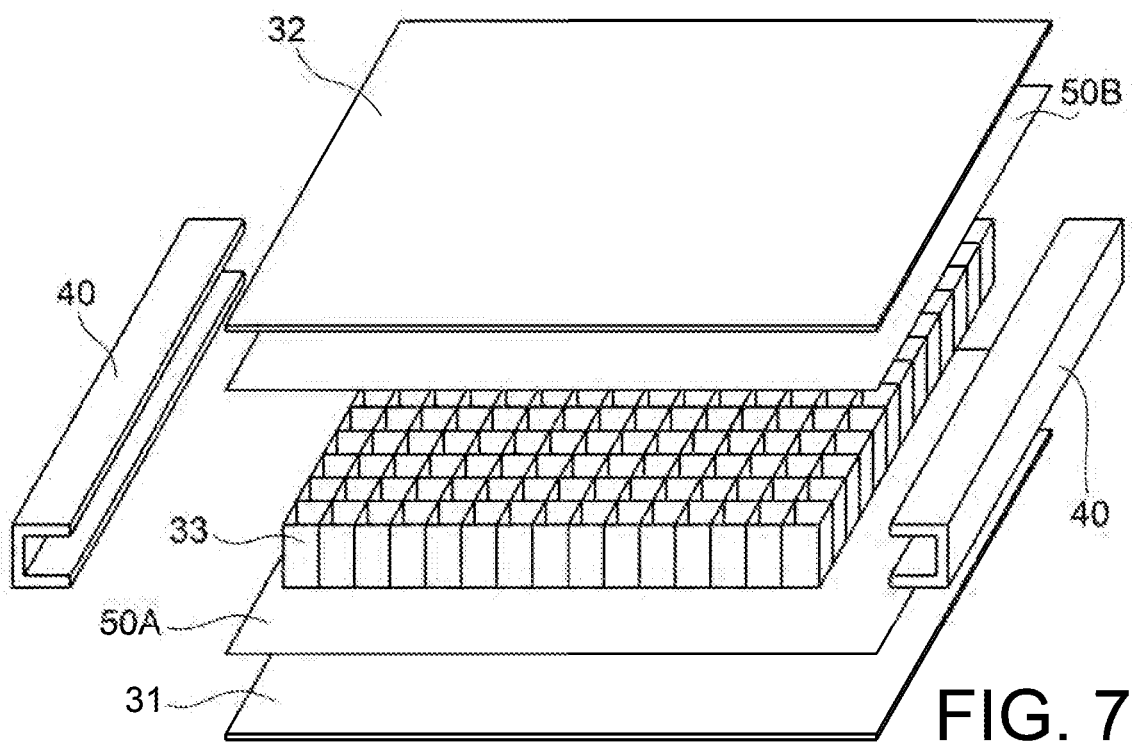
FIG. 7 is a schematic perspective and exploded view of a panel according to the invention, before fastening the constituent elements thereof to one another, this figure showing brazing foils inserted between said constituent elements.

With reference to the illustration in FIG. 7 wherein the panel 30 comprises two sealing flanges 40 to be assembled, a brazing foil 50A is disposed between the inner skin 31, on one hand, and, on the other, an inner face of the alveolar structure 33 and one of the lateral arms of each of the sealing flanges 40. Another brazing foil 50B is disposed between the outer skin 32, on one hand, and, on the other, an outer face of the alveolar structure 33 and the other lateral arm of each of the sealing flanges 40.

Conventionally, the elements of the panel 30 to be assembled are in this example placed in a brazing tool 60 making it possible to place the latter under gas pressure inside a vacuum furnace (not shown).

Figure 8:
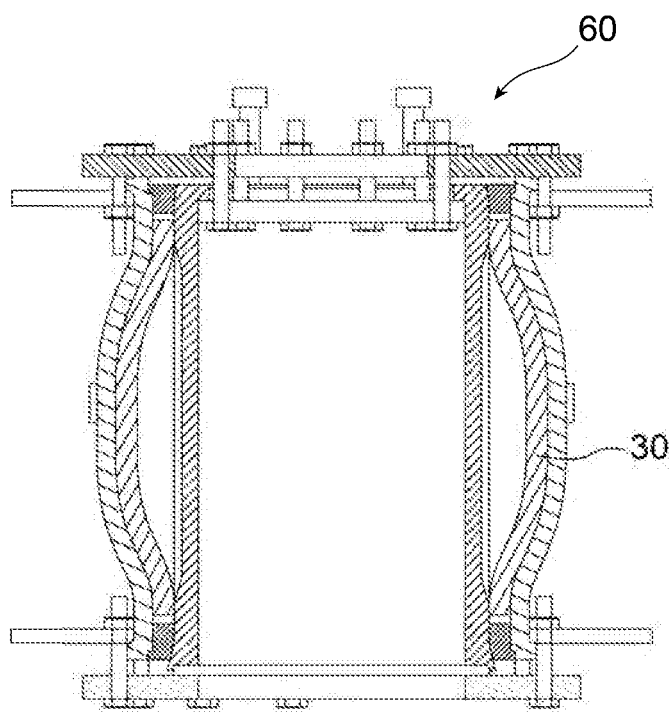
FIG. 8 is a schematic axial sectional view of a brazing tool receiving a panel according to the invention.

FIG. 8 shows a conventional brazing tool 60 adapted to braze a panel 30 intended to form a portion of the ejection plug 16 in FIG. 3. The implementation of such a tool is for example described in the document WO 2014/020286 A1.

To particularly prevent the collapse of on the lateral arms 42 and 43 of the sealing flange 40 during the brazing, reinforcements are placed in the cavity 46 of this sealing flange 40 so as to keep these lateral arms 42 and 43 separated from one another.

Different types of reinforcements 70 are described hereinafter with reference to FIGS. 9 to 23.

Figure 9:
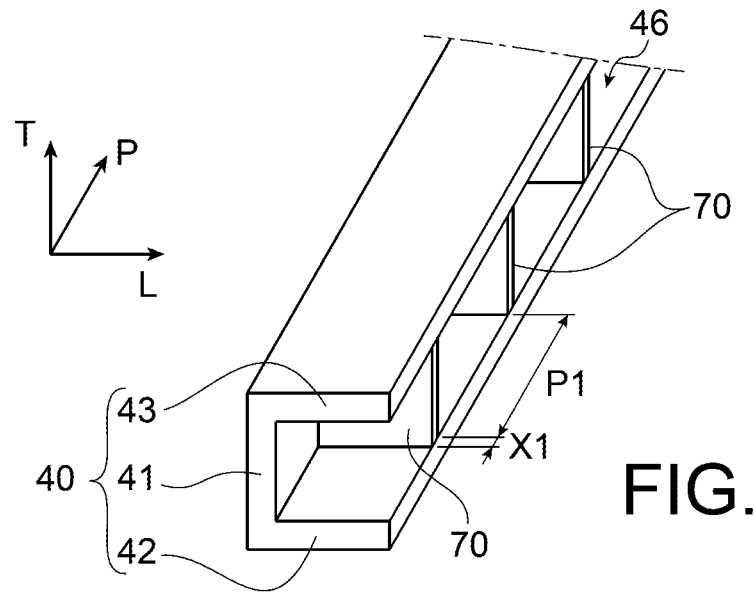
FIG. 9 is a partial schematic perspective view of a sealing flange and reinforcements for a panel according to a first embodiment of the invention.
Figure 10:
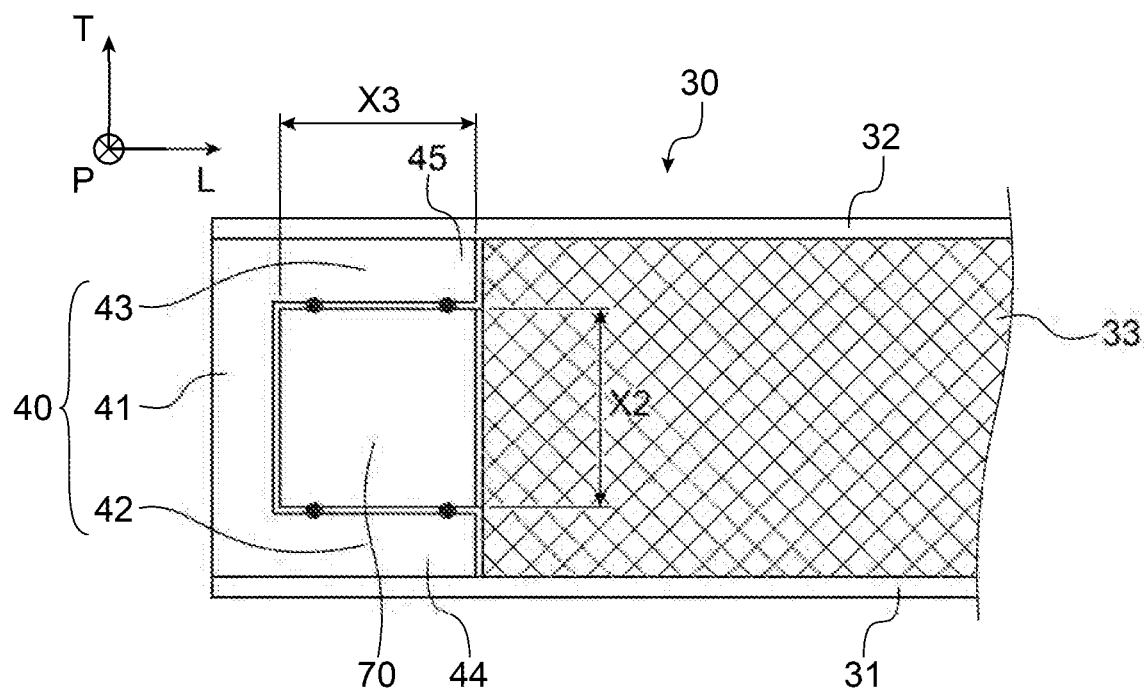
FIG. 10 is a partial schematic axial sectional view of a panel according to the first embodiment of the invention.

FIGS. 9 and 10 show a first embodiment, wherein reinforcements 70 are produced in the form of transverse walls each extending perpendicularly in relation to the principal direction P.

In this example, each transverse wall 70 has a thickness X1 of approximately 1 mm and two consecutive transverse walls 70 are spaced apart, along the principal direction P, by a distance P1 of approximately 20 mm.

Each transverse wall 70 has moreover a dimension X2 along the transverse direction T so as to extend into the cavity 46 substantially from the lateral arm 42 to the lateral arm 43 of the sealing flange 40.

Each transverse wall 70 has a dimension X3 along the longitudinal direction L so as to extend into the cavity 46 substantially from the base 41 to the free ends 44 and 45 of the lateral arms 42 and 43 of the sealing flange 40.

In this example, each transverse wall 70 is flush with the surface of the lateral arms 42 and 43 facing the alveolar structure 33.

Figure 11:
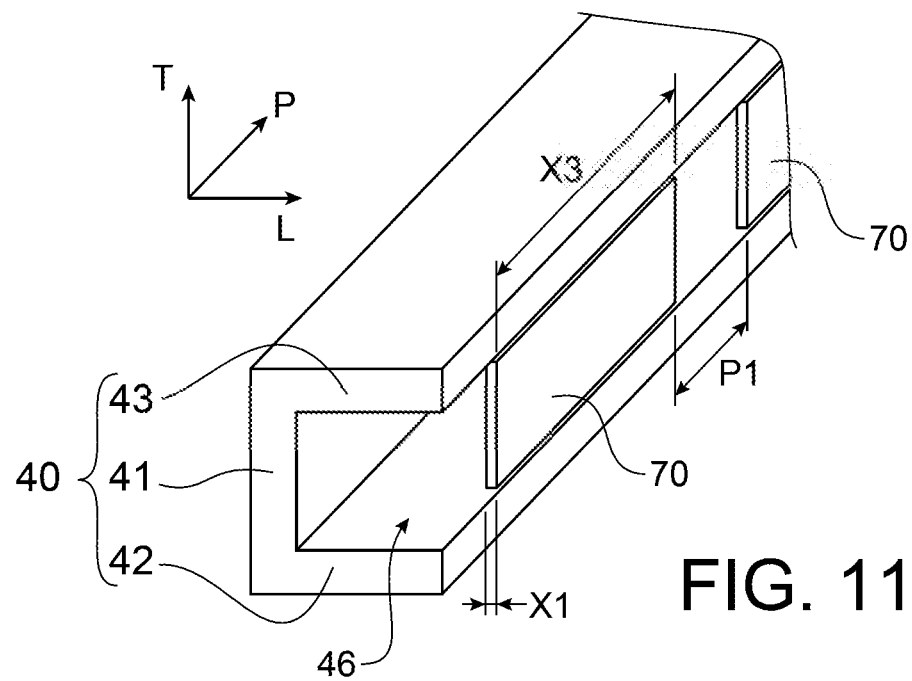
FIG. 11 is a partial schematic perspective view of a sealing flange and reinforcements for a panel according to a second embodiment of the invention.
Figure 12:
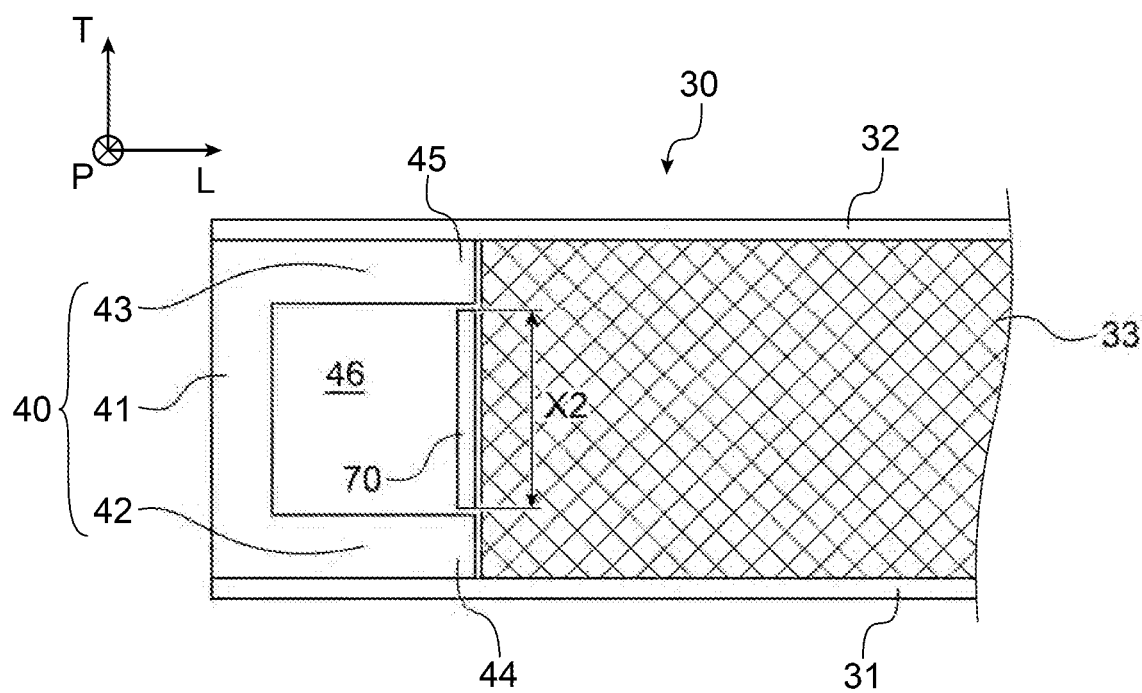
FIG. 12 is a partial schematic axial sectional view of a panel according to the second embodiment of the invention.

FIGS. 11 and 12 show a second embodiment, wherein reinforcements 70 are produced in the form of transverse walls each extending parallel with the principal direction P.

In this second embodiment, each of the transverse walls 70 has a thickness X1 of approximately 1 mm, and a dimension X2 along the transverse direction T so as to extend into the cavity 46 substantially from the lateral arm 42 to the lateral arm 43 of the sealing flange 40.

More specifically, each of the transverse walls 70 is in this example positioned at the free ends 44 and 45 of the lateral arms 42 and 43 so as to be flush with the surface of these lateral arms 42 and 43 facing the alveolar structure 33.

Each of the transverse walls 70 has in this example a dimension X3 along the principal direction P of approximately 60 mm, and two consecutive transverse walls 70 along this direction are spaced apart by a distance P1 of approximately 20 mm.

Figure 24:
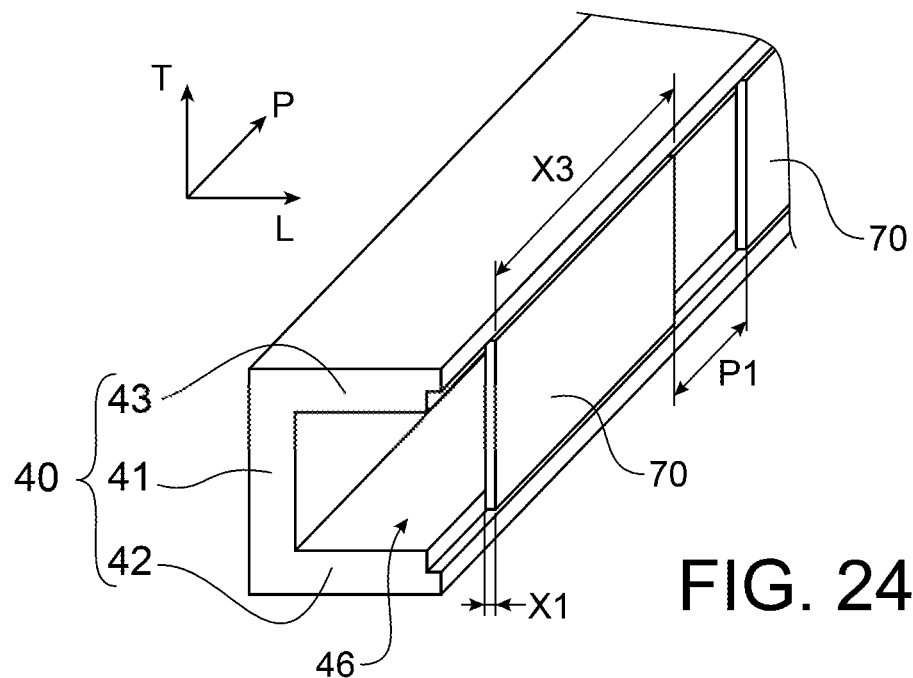
FIG. 24 is a partial schematic perspective view of a sealing flange and reinforcements for a panel according to a seventh embodiment of the invention.
Figure 25:
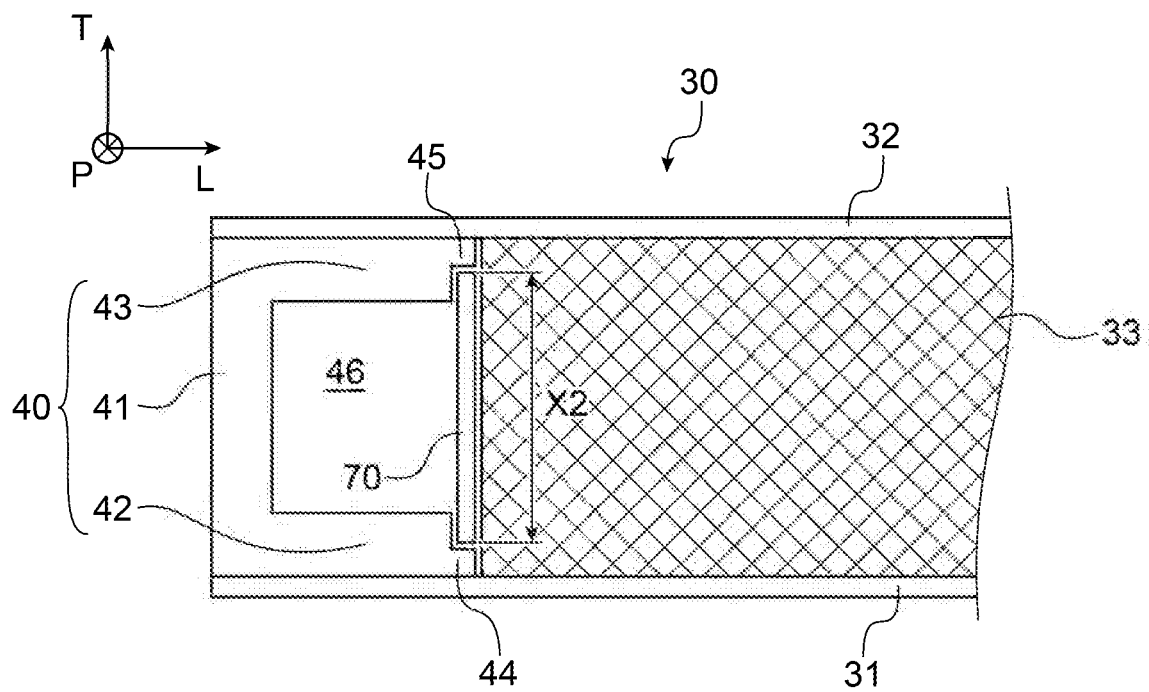
FIG. 25 is a partial schematic axial sectional view of a panel according to the seventh embodiment of the invention.

FIGS. 24 and 25 represent an alternative embodiment of this second embodiment making it possible to facilitate the positioning of the transverse walls 70.

This alternative embodiment differs from the second embodiment in that each of the lateral arms 42 and 43 comprises, at the free end 44 or 45 thereof, a groove extending along the principal direction P. It also differs in that the dimension X2 of the transverse walls 70 is greater than the gap between the lateral arms 42 and 43 along the transverse direction T, such that the ends of the transverse walls 70, along the transverse direction T, are housed in the grooves of the lateral arms 42 and 43. Thus, each of the transverse ends of the transverse walls 70 is located longitudinally between the lateral arm 42 or 43 and the alveolar structure 33 while extending along the transverse direction T between the shoulders of the lateral arms 42 and 43, these shoulders being formed by the grooves described above.

Figure 13:
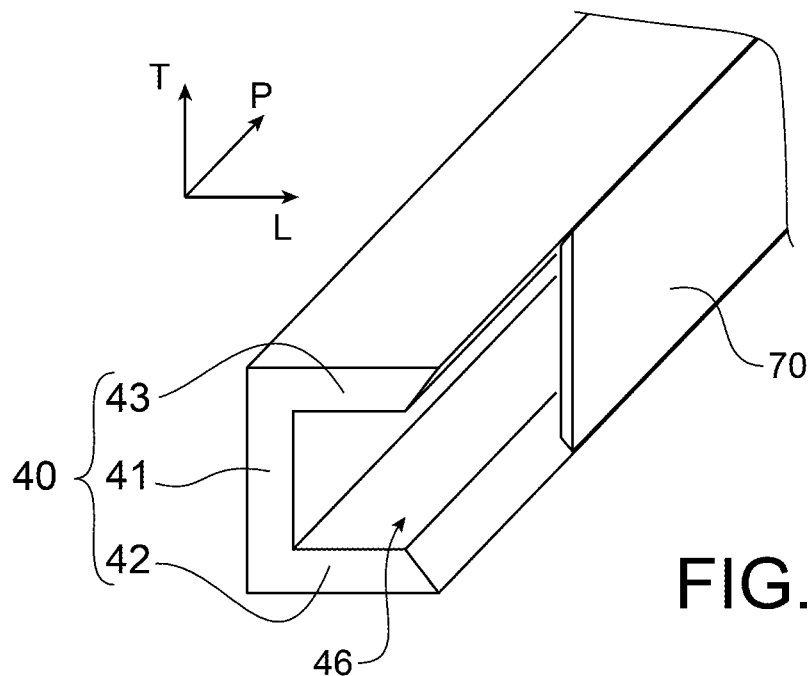
FIG. 13 is a partial schematic perspective view of a sealing flange and reinforcements for a panel according to a third embodiment of the invention.
Figure 14:
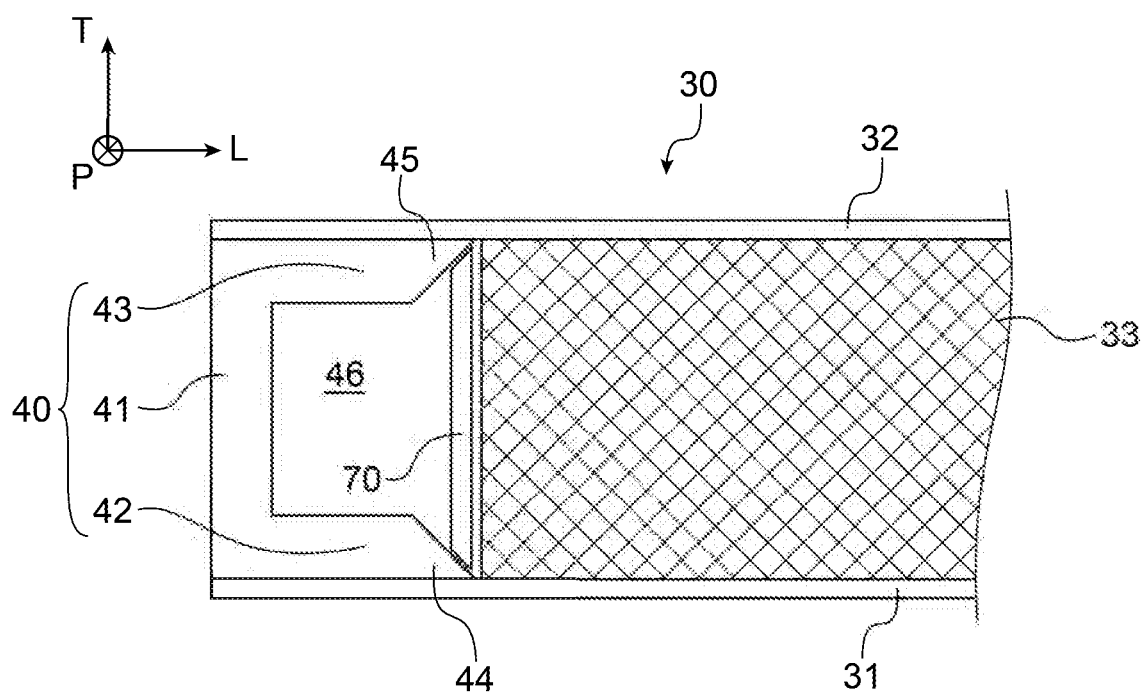
FIG. 14 is a partial schematic axial sectional view of a panel according to the third embodiment of the invention.

FIGS. 13 and 14 show a third embodiment which differs from the second embodiment in that the free ends 44 and 45 of the lateral arms 42 and 43 comprise a chamfer, and the ends of the transverse walls 70, along the transverse direction T, each comprise a corresponding chamfer making it possible to lock these walls 70 on the lateral arms 42 and 43.

In each of the embodiments described above, it is preferably to fasten the transverse walls 70 to the sealing flange 40, for example by welding or brazing, in view in particular of the thickness X1 of these walls 70, in order to hold them in position at least during the brazing of the panel 30.

Figure 15:
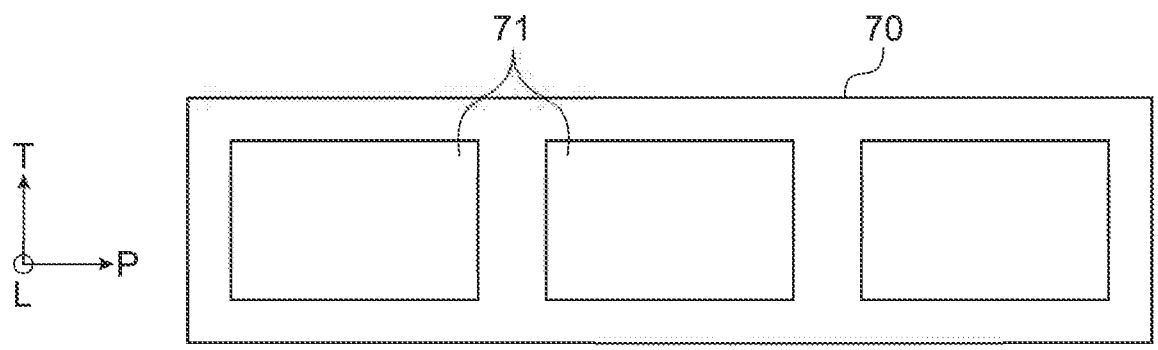
FIG. 15 is a partial schematic view of a reinforcement for a panel according to the second and the third embodiment of the invention, this reinforcement comprising a first type of openings.
Figure 16:
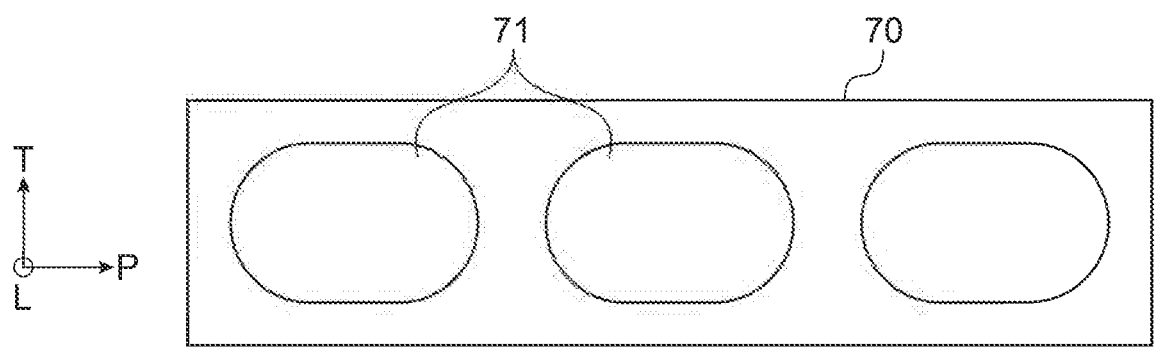
FIG. 16 is a partial schematic view of a reinforcement for a panel according to the second or the third embodiment of the invention, this reinforcement comprising a second type of openings.

Numerous alternative embodiments can be added to these embodiments without leaving the scope of the invention. For example, the transverse walls 70 of the second and third embodiments and of the embodiment in FIGS. 24 and 25, can comprise openings 71 as illustrated in FIGS. 15 and 16, in order to reduce the mass of the panel 30.

Figure 17:
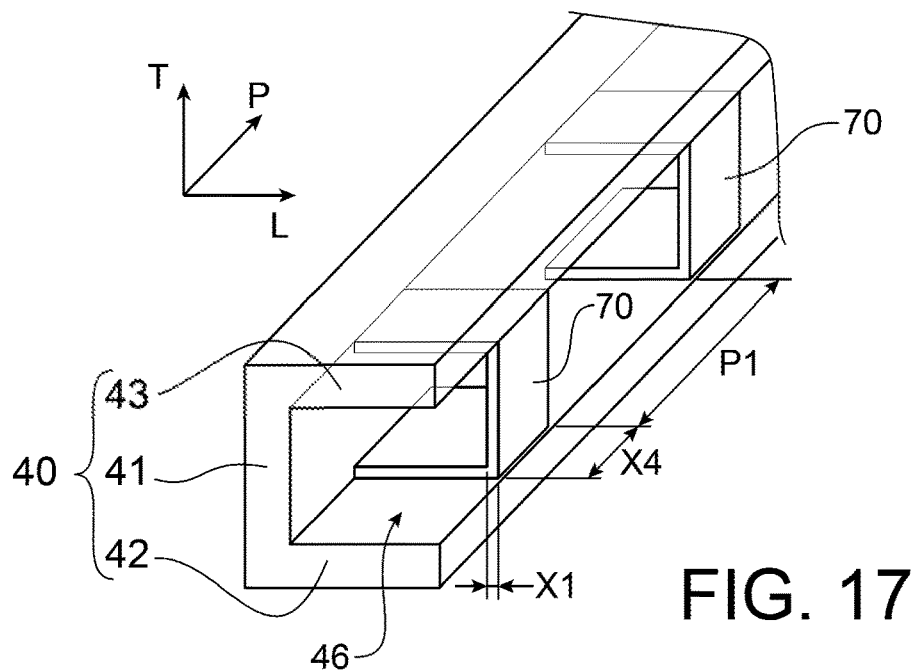
FIG. 17 is a partial schematic perspective view of a sealing flange and reinforcements for a panel according to a fourth embodiment of the invention.
Figure 18:
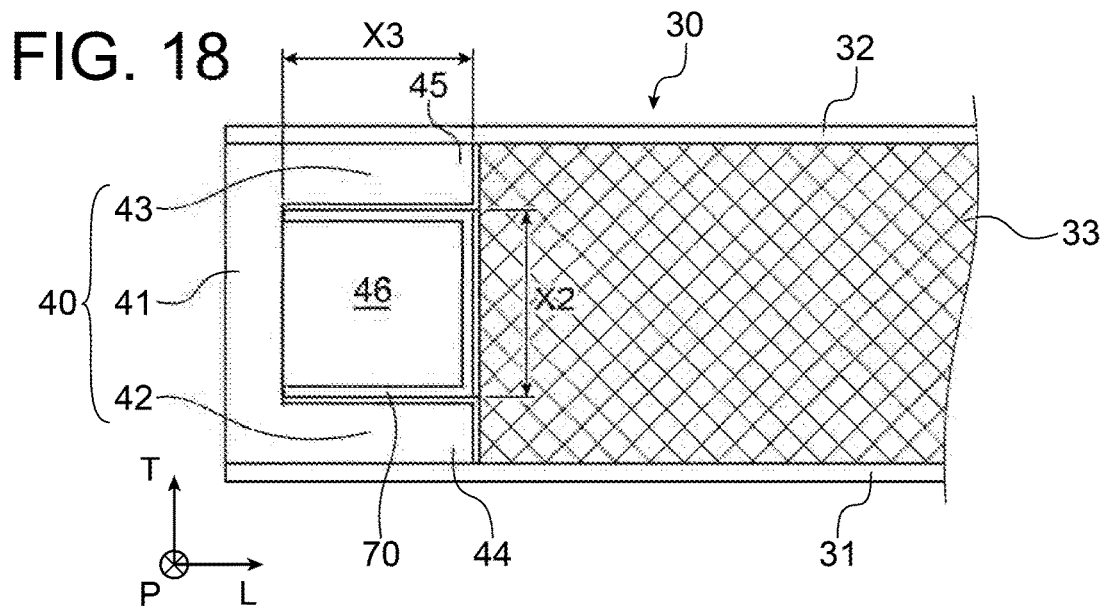
FIG. 18 is a partial schematic axial sectional view of a panel according to the fourth embodiment of the invention.

FIGS. 17 and 18 show a fourth embodiment, wherein reinforcements 70 are foils having a U-shaped cross-section.

Figure 19:
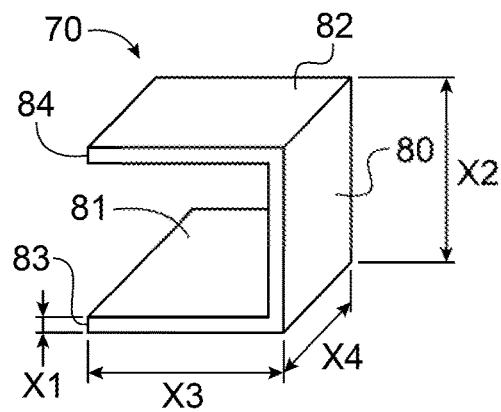
FIG. 19 is a partial schematic view of a reinforcement for a panel according to the fourth embodiment of the invention.

Such a foil 70 is represented separately in FIG. 19. This foil 70 comprises a base 80 and two lateral arms 81 and 82 connected to the base 80. Each of the lateral arms 81 and 82 comprises a free end 83 and 84 respectively.

With reference to FIGS. 17 and 18, for each foil 70, the free end 83 and 84 of each of the lateral arms 81 and 82 is facing the base 41 of the sealing flange 40, and the base 80 of the foil 70 extends between the free ends 44 and 45 of the sealing flange 40 so as to be flush with the surface of these free ends 44 and 45 facing the alveolar structure 33.

In this fourth embodiment, each portion of the foils 70, i.e. the base 80 and the lateral arms 81 and 82, has a thickness X1 of approximately 1 mm.

The base 80 has a dimension X2 along the transverse direction T so as to extend into the cavity 46 substantially from the lateral arm 42 to the lateral arm 43 of the sealing flange 40.

The lateral arms 81 and 82 each have a dimension X3 along the longitudinal direction L so as to extend into the cavity 46 substantially from the free ends 44 and 45 of the sealing flange 40 to the base 41 of this flange 40.

Each of the foils 70 has in this example a dimension X4 along the principal direction P of approximately 8 mm, and two consecutive foils 70 along this direction are spaced apart by a distance P1 of approximately 20 mm.

The foils 70 can be sized to be held in position by a spring effect thanks to the U shape thereof. Alternatively, the foils 70 can be fastened to the sealing flange 40, for example by welding or brazing.

Figure 20:
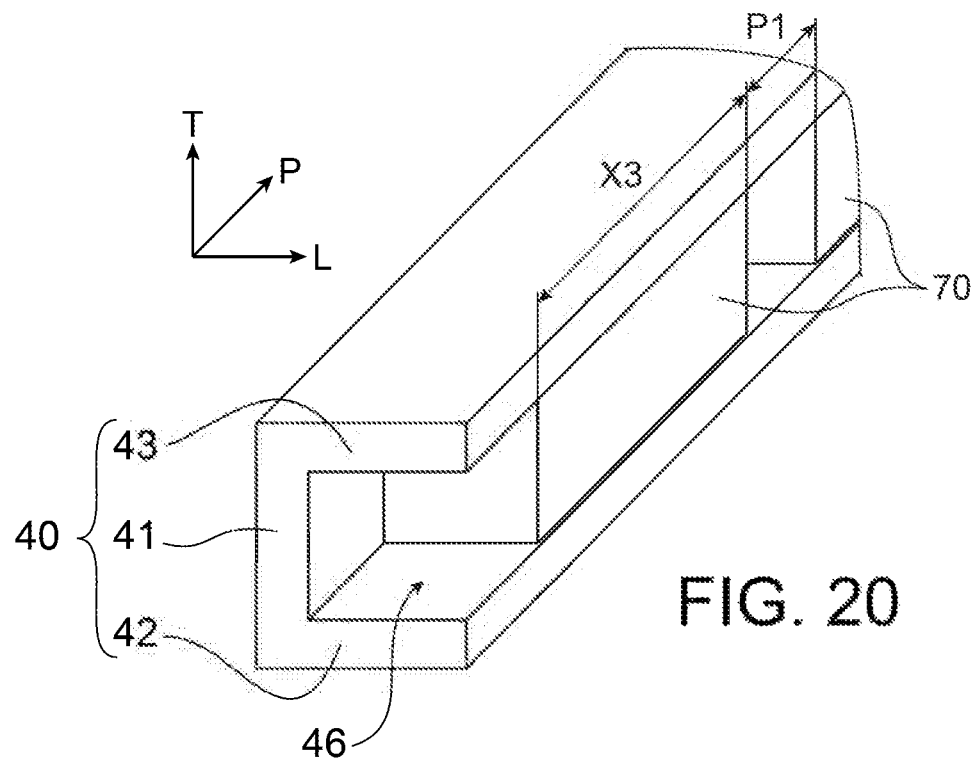
FIG. 20 is a partial schematic perspective view of a sealing flange and reinforcements for a panel according to a fifth embodiment of the invention.
Figure 21:
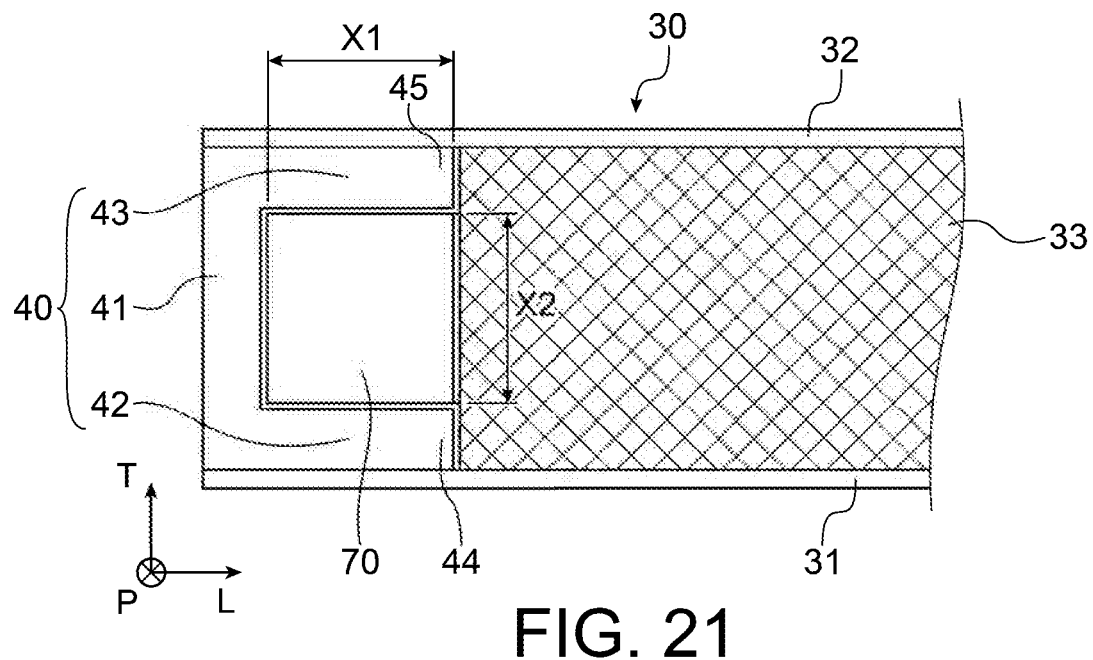
FIG. 21 is a partial schematic axial sectional view of a panel according to the fifth embodiment of the invention.

FIGS. 20 and 21 show a fifth embodiment, wherein the reinforcements 70 are formed by blocks extending along the principal direction and having a substantially similar cross-section to that of the cavity 46, i.e. a substantially square cross-section.

In this example, the blocks 70 consist of an alveolar structure, for example of the same type as the alveolar structure 33. The cells (not shown) of the blocks 70 reduce the mass thereof.

In this fifth embodiment, each of the blocks 70 has a dimension X1 along the longitudinal direction L so as to extend into the cavity 46 substantially from the base 41 to the free ends 44 and 45 of the sealing flange 40, i.e. in this instance up to the alveolar structure 33 so as be flush with the surface of the lateral arms 42 and 43 facing the alveolar structure 33.

Each of these blocks 70 has a dimension X2 along the transverse direction T so as to extend into the cavity 46 substantially from the lateral arm 42 to the lateral arm 43 of the sealing flange 40.

Finally, each of these blocks 70 has in this example a dimension X3 along the principal direction P of approximately 60 mm, two consecutive blocks 70 along this direction being spaced apart by a distance P1 of approximately 20 mm.

For each of the embodiments described above, each reinforcement 70 can be fastened permanently to the sealing flange 40, for example by welding or brazing. In this case, the reinforcements 70 contribute to a certain extent to the structural strength of the panel 30 during the use thereof.

Alternatively, when the sealing flange 40 is not annular and the cavity 46 remains, after manufacturing the panel 30, open at least at one end along the principal direction P, the reinforcements 70 can be removed in order to reduce the mass of the panel 30.

The technique for removing the reinforcements 70 after manufacturing the panel 30 depends on the type of connection between the reinforcements 70 and the sealing flange 40.

When the reinforcements 70 have been welded or brazed, the corresponding welding spots need to be broken to remove them. Obviously, the fastening thereof to the sealing flange 40 must in this case be weak enough to enable such a break while being strong enough to remain in position during the brazing of the constituent elements of the panel 30.

The reinforcements 70 can also be held in the cavity 46 during the manufacture of the panel 30 by thermal expansion of the reinforcements 70, which are then dimensioned adjusted with a tightening making it possible, at ambient temperature, to insert them into the cavity 46 and to remove them after manufacturing the panel 30.

Regardless of the type of connection between reinforcements 70 and sealing flange 40, it is preferably to use an anti-diffuser to prevent the reinforcements 70 from being welded to the sealing flange 40 and to the alveolar structure 33, by diffusion, during the brazing of the panel 30.

As a general rule, the reinforcements 70 preferably comprise a material having an expansion coefficient identical to or greater than that of the sealing flange 40, so that the reinforcements 70 keep the lateral arms 42 and 43 of the sealing flange 40 separated from one another during the brazing of the panel 30.

Figure 22:
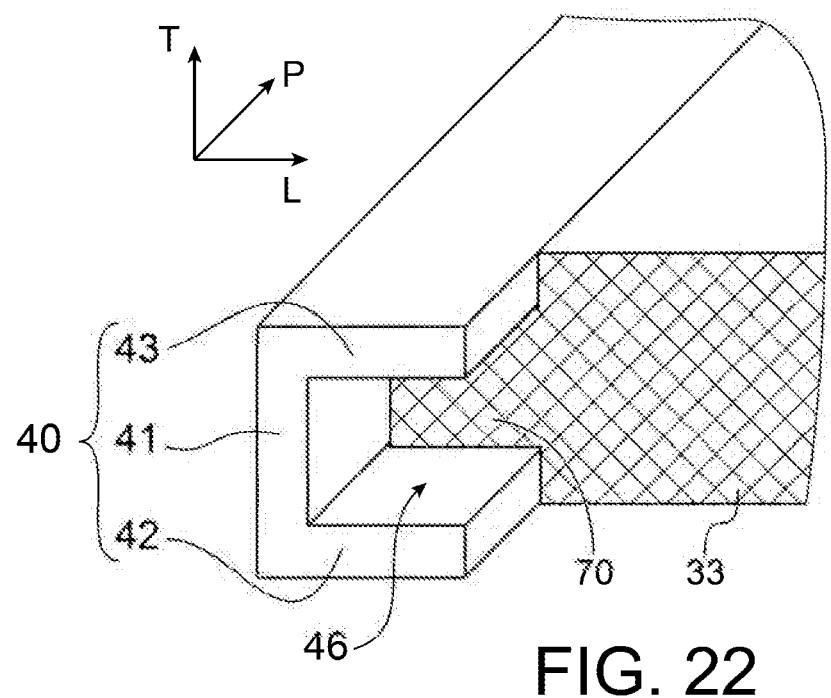
FIG. 22 is a partial schematic perspective view of a sealing flange and reinforcements for a panel according to a sixth embodiment of the invention.
Figure 23:
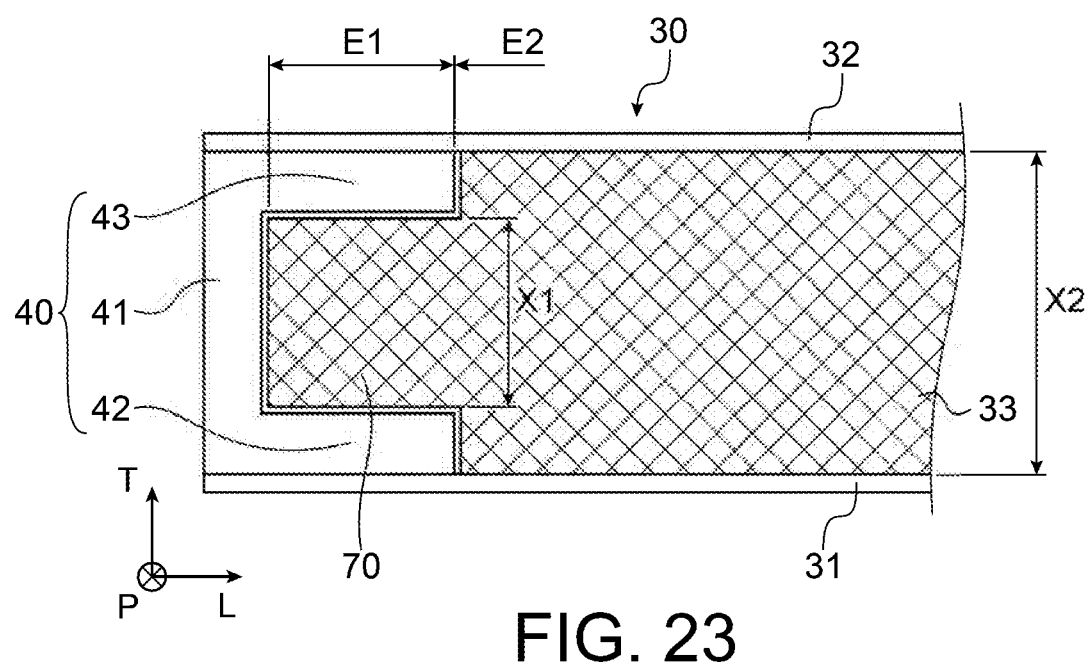
FIG. 23 is a partial schematic axial sectional view of a panel according to the sixth embodiment of the invention.

FIGS. 22 and 23 show a sixth embodiment, wherein a reinforcement 70 is formed by a respective portion of the alveolar structure 33 of the panel 30.

For this purpose, the alveolar structure 33 is previously machined such that the end E1 of this structure 33 housed in the cavity 46 of the sealing flange 40 to form the reinforcement 70 has a dimension X1 along the transverse direction T less than the thickness X2 of the alveolar structure 33 on the central portion E2 of this structure 33.

The embodiments described above are given by way of non-limiting examples. In particular, insofar as the reinforcements 70 fulfil during the brazing of the panel 30 their function of holding the separation of the lateral arms 42 and 43, the shape, the dimensions or the number of these reinforcements 70 and the positioning thereof in relation to one another can be different from those described above, without leaving the scope of the invention.

The invention claimed is:

1. A structural and/or acoustic panel for an aircraft propulsion assembly, said panel comprising:
   an inner skin,
   an outer skin,
   an alveolar structure,
   a sealing flange, said sealing flange comprising a base and two lateral arms connected to the base, each lateral arm comprising a free end, the lateral arms and the base delimiting a cavity which opens at the free end of the lateral arms, the alveolar structure and the sealing flange being enclosed between the inner skin and the outer skin, one of the lateral arms of the sealing flange being fastened to the inner skin, the other lateral arm of the sealing flange being fastened to the outer skin, and
   reinforcements extending into said cavity so as to keep the lateral arms of the sealing flange separated from one another
   wherein the free end of each of the lateral arms is facing the alveolar structure such that the alveolar structure delimits said cavity, and
   wherein the reinforcements comprise transverse walls fastened to the lateral arms of the sealing flange and spaced apart along a principal direction along which the sealing flange extends.

2. The panel according to claim 1, wherein the transverse walls extend:
   between the free end of the lateral arms of the sealing flange and the base of said sealing flange, perpendicularly to said principal direction, or
   parallel with said principal direction such that the transverse walls are fastened to the free ends of the lateral arms of the sealing flange.

3. The panel according to claim 1, wherein the reinforcements comprise foils each comprising a base and two lateral arms connected to the base, each lateral arm of each foil comprising a free end facing the base of the sealing flange, the base of each foil extending between the free ends of the sealing flange.

4. The panel according to claim 1, wherein the reinforcements comprise at least one of one or more portions of said alveolar structure and one or more other alveolar structures.

5. The panel according to claim 1, wherein the inner and outer skins, the alveolar structure and the sealing flange comprise metal.

6. The panel according to claim 1, said panel having an axis of symmetry about which the inner and outer skins, the alveolar structure and the sealing flange extend.

7. An aircraft propulsion assembly component, said component being selected from a list including an ejection plug, an ejection nozzle, an inner fixed structure and an air inlet lip, said component comprising one or more panels according to claim 1.

8. An aircraft, comprising at least one component according to claim 7.

9. A method for manufacturing a panel according to claim 1, said method comprising:
   disposing the alveolar structure and the at least one sealing flange between the inner skin and the outer skin, and
   brazing the alveolar structure and the at least one sealing flange with the inner skin and the outer skin.

10. The method according to claim 9, further comprising disposing reinforcements in the cavity of the at least one sealing flange before implementing said brazing.

* * * * *

UNITED STATES PATENT AND TRADEMARK OFFICE
CERTIFICATE OF CORRECTION

| | | |
|---|---|---|
| PATENT NO. | : 12,065,988 B2 | Page 1 of 1 |
| APPLICATION NO. | : 17/641383 | |
| DATED | : August 20, 2024 | |
| INVENTOR(S) | : Miossec et al. | |

It is certified that error appears in the above-identified patent and that said Letters Patent is hereby corrected as shown below:

In the Specification

In Column 6, Line 20, delete "138" and insert -- 13B --, therefor.

In Column 6, Line 20, delete "188" and insert -- 18B --, therefor.

In Column 6, Line 21, delete "208" and insert -- 20B --, therefor.

In Column 7, Line 45, delete "188" and insert -- 18B --, therefor.

In Column 7, Line 45, delete "138" and insert -- 13B --, therefor.

Signed and Sealed this
Tenth Day of December, 2024

Katherine Kelly Vidal
*Director of the United States Patent and Trademark Office*